Sept. 4, 1945.  R. H. CUYLER ET AL  2,384,159
PRESSURE MEASURING DEVICE
Filed Oct. 11, 1940   5 Sheets-Sheet 3

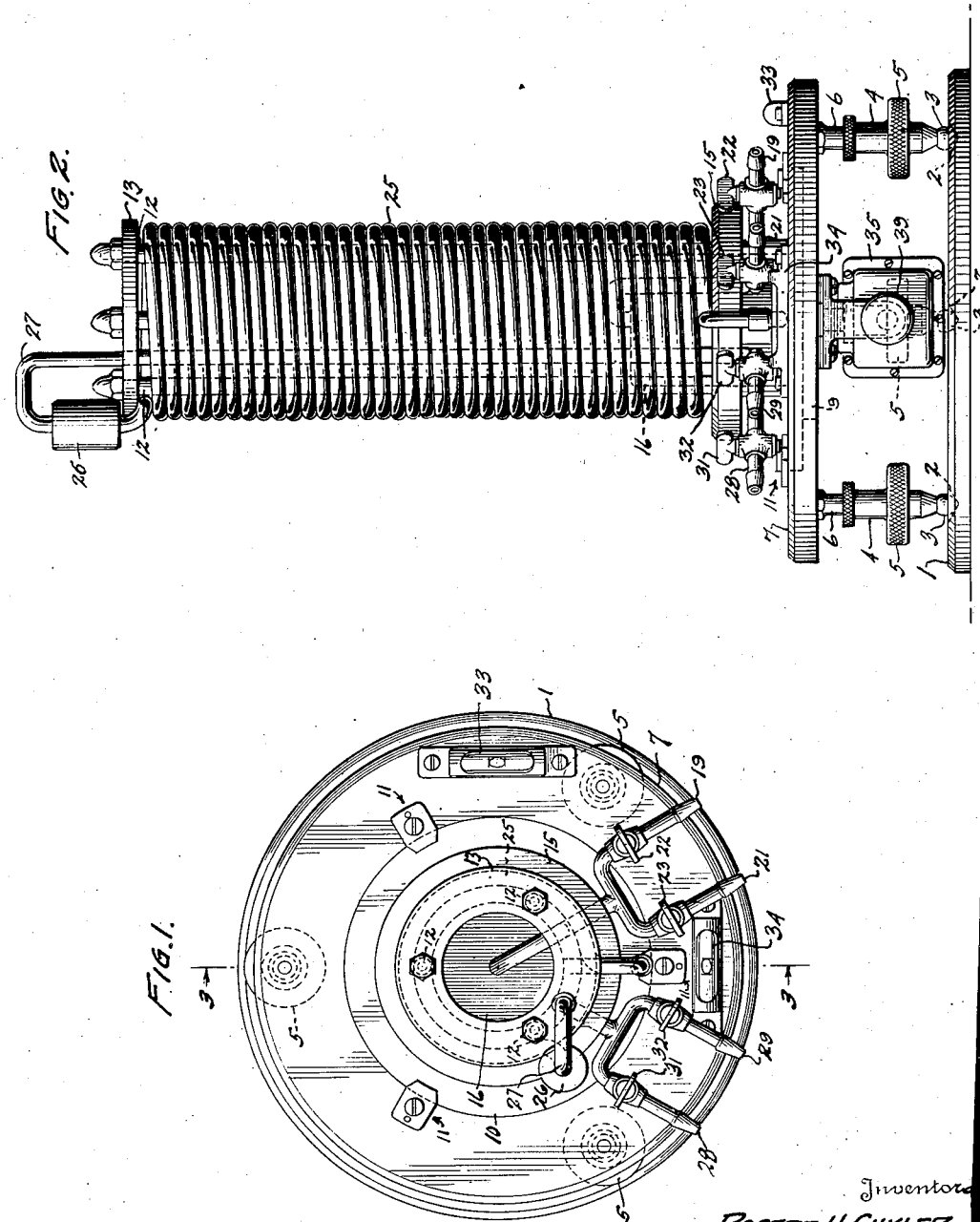

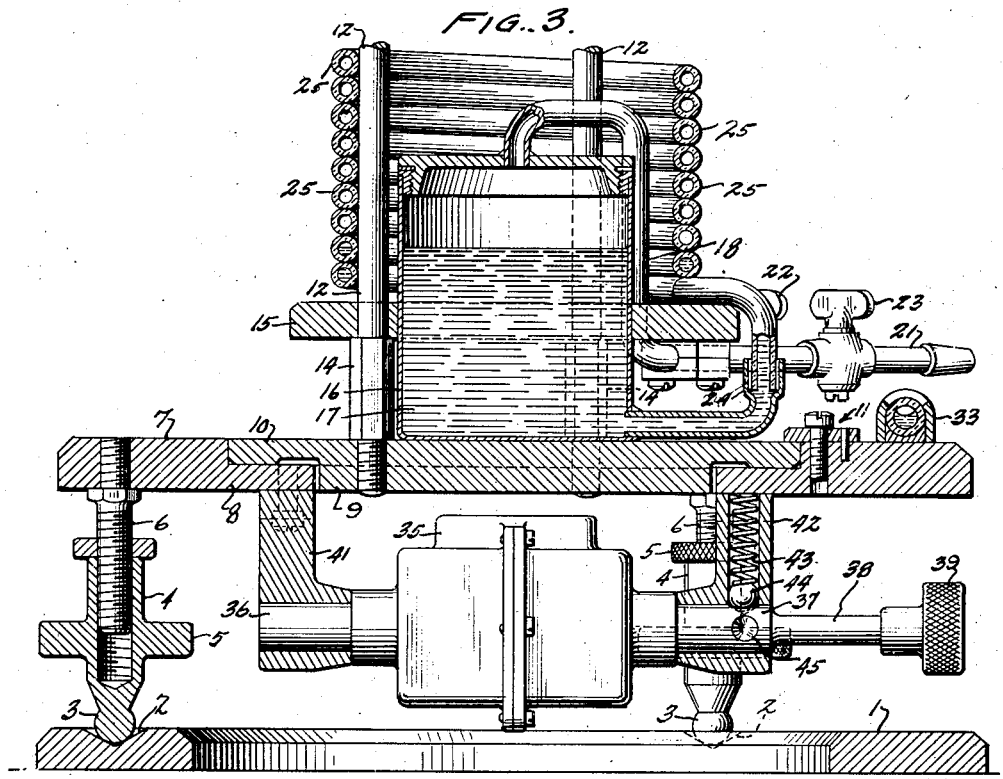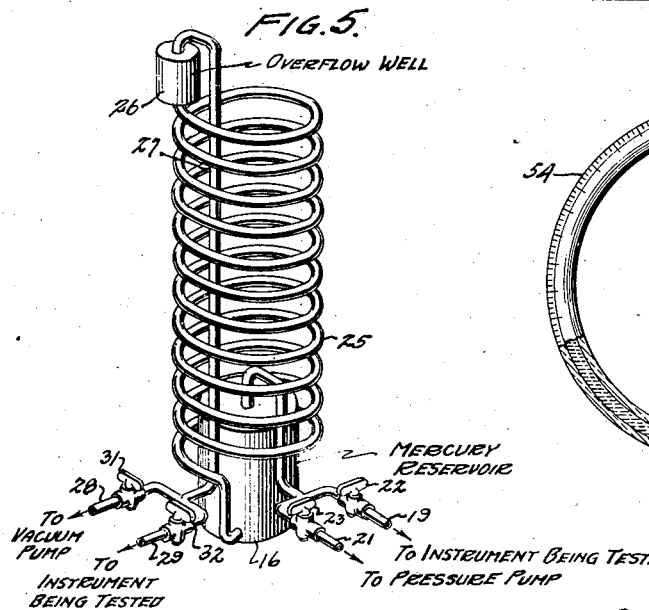

Inventors
ROBERT H. CUYLER
AND RICHARD L. GOETH

By Semmes, Keegin & Semmes
Attorneys

Sept. 4, 1945.  R. H. CUYLER ET AL  2,384,159
PRESSURE MEASURING DEVICE
Filed Oct. 11, 1940  5 Sheets-Sheet 4

Inventors
ROBERT H. CUYLER
AND RICHARD L. GOETH
By Semmes, Keegin & Semmes
Attorneys Sept. 4, 1945. R. H. CUYLER ET AL 2,384,159
PRESSURE MEASURING DEVICE
Filed Oct. 11, 1940 5 Sheets-Sheet 5
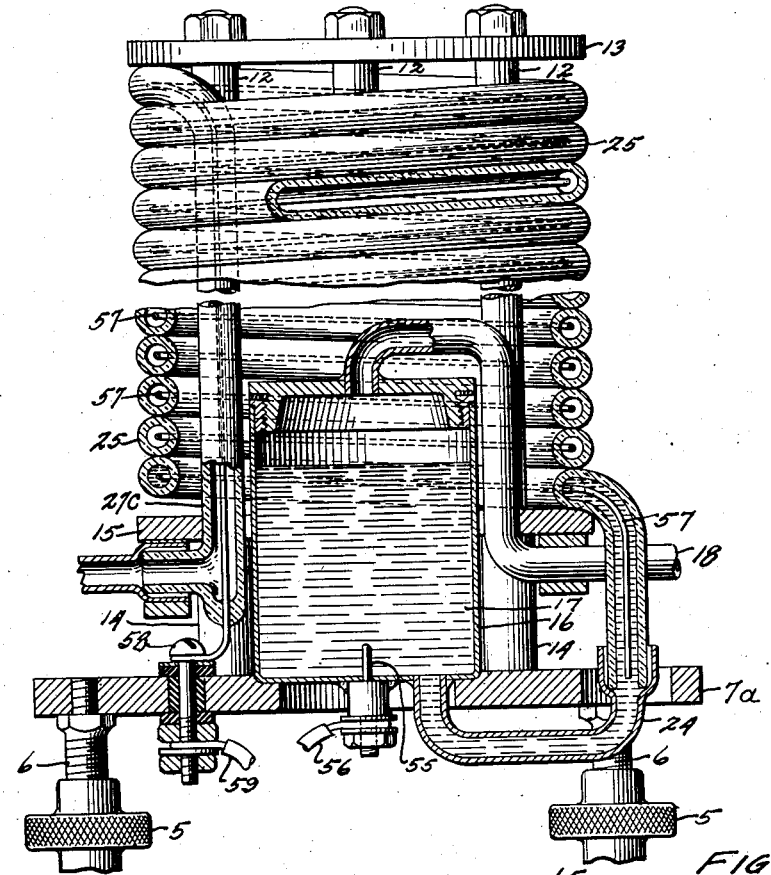
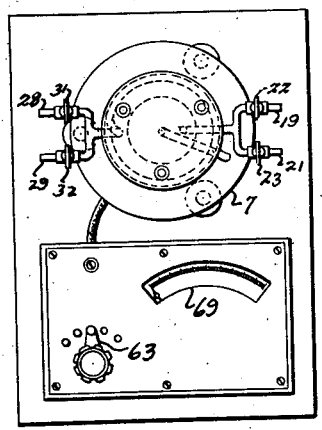
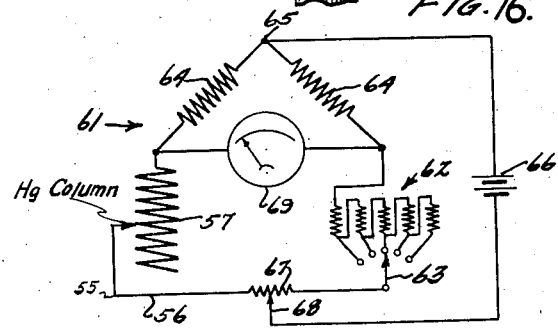
Inventors
ROBERT H. CUYLER
AND RICHARD L. GOETH
By Semmes, Keegin & Semmes
Attorney Patented Sept. 4, 1945

2,384,159

UNITED STATES PATENT OFFICE 2,384,159

PRESSURE MEASURING DEVICE

Robert H. Cuyler, Austin, and Richard L. Goeth, Wichita Falls, Tex., assignors to John F. Camp, San Antonio, Tex.

Application October 11, 1940, Serial No. 360,848

9 Claims. (Cl. 73—398)

This invention relates to a measuring device, and has especial reference to a device for measuring a pressure or force by noting the displacement of a body of liquid. The inventive concept may be embodied in instruments of varying type and for various purposes, but the invention will be here described with reference to a manometer.

The devices which are described herein are improvements upon the device set forth in our co-pending application Serial No. 286,657, filed July 26, 1939, which resulted in Patent No. 2,303,311, dated November 24, 1942.

Manometers, and other devices of generally similar characteristics, heretofore available have not possessed the accuracy that is desirable, particularly for certain types of work. We have found that by measuring the displacement of a liquid in an elongated tube that is angularly disposed to the vertical greatly increased accuracy is possible over that obtainable when a truly vertical tube is used. In such angularly disposed tubes, however, it is especially essential that the angle to the vertical shall be fixed and definite, and therefore it is necessary that ready and positive means be available for insuring the desired angle. Furthermore while an instrument constructed in accordance with our invention is extremely accurate, there is an increased tendency for the indicating fluid to lag within the tube as variations in the force occur. It is therefore particularly essential that there be incorporated in the device means for rendering the indicating fluid quickly responsive to variations in the force being measured. Certain features of constructional design are also desirable, such as easy recognition of variations in the measuring fluid, ready manipulation of the device, and ease and economy of manufacture.

To accomplish the above is an object of this invention.

Another object of this invention is to provide means for adjusting the position of the body of fluid so that it may be adjusted to and maintained at the true horizontal.

Yet another object of this invention is to provide, in association with the measuring device, means for imparting vibrations to the device in order to render the fluid body quickly responsive to changes in the force being measured.

Still another object of this invention is to provide a device in which displacements in the measuring liquid can be readily observed by an operator without having to change his position.

A still further object of this invention is to provide means for indirectly indicating changes in the liquid body.

To embody our inventive concept in a specific apparatus, we propose to employ an elongated channel that is disposed at a substantial angle to the vertical and which contains a body of liquid that is subject to, and whose position is governed by, the force to be measured. Preferably the elongated channel assumes the shape of a helix and thereby a substantial length of the channel may be encompassed within a relatively small area. As will be indicated hereafter the channel need not necessarily be in a truly helical form, for relatively wide departures from a helix may be employed. The invention contemplates means for readily adjusting the position of the channel with respect to the vertical that is to say, readily adjusting and maintaining the channel in the true horizontal. There is also provided means for vibrating the channel and its liquid content in order to render the liquid responsive to changes in the force being measured. In the preferred form, the channel may be movable so that any point of the channel may be readily brought to a position in front of the operator's eyes. The position of the liquid within the channel may be either directly observed, or may be indirectly noted, such as by an electric circuit in which is positioned means for registering variations in the circuit in accordance with displacement of the measuring liquid.

In the accompanying drawings we have disclosed an embodiment of the invention as above broadly indicated, and have also shown certain variations in the construction of the device. In these drawings:

Figure 1 is a top plan view of a device constructed in accordance with our invention.

Figure 2 is a side elevation of the device.

Figure 3 is a partial sectional view of the device taken along the line 3—3 of Figure 1.

Figure 4 is a detail view of the coil employed in the device of Figures 1–3.

Figure 5 is a diagrammatic view of the coil and associated parts, with the individual convolutions exaggeratedly spaced.

Figure 14 is a view partly in elevation and partly in section of a device equipped with means for electrically registering the displacement of the liquid.

Figure 15 is a top plan view of the device of Figure 14.

Figure 16 illustrates the electric circuit that may be used in the device of Figure 14.

Figure 6:
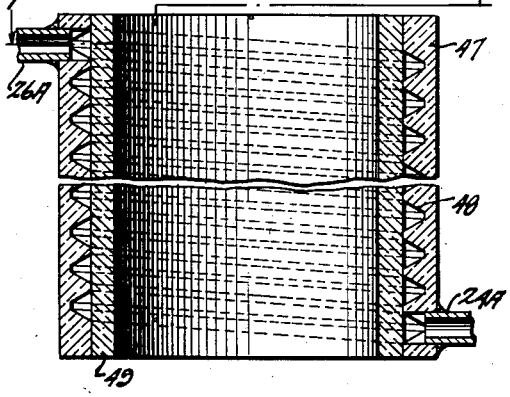
Figure 6 is a view of a modified form of channel.

Referring more particularly to Figures 2 and 3, we provide a base plate or ring 1 which may be firmly secured to a table, bench, or other supporting means for the assembled apparatus. The base ring may be provided with three or more sockets 2 in which rest balls 3 formed upon adjusting nuts 4. The nuts 4 are provided with knurled flanges 5 to facilitate rotation of the nuts, and are also provided with threaded channels to receive correspondingly threaded bolts 6.

The bolts 6 are suitably secured in a supporting ring 7 which is provided with a machined inner annular lip 8. It will be observed that the plane of the ring may be adjusted by means of the nuts 4 and bolts 6. As will be later pointed out, this permits the adjustment of the liquid channel to the desired angle. In other words, by virtue of this construction it is possible to adjust and maintain the liquid channel in the true horizontal, which, of course is desirable.

The liquid channel and associated means are carried by a supporting plate 9 provided with a shoulder 10 which is seated upon ring lip 8, and the contacting face of which shoulder is likewise machined. The plate 9, therefore, and its supported structure, may be readily rotated upon lip 8. Retaining members, designated generally 11, retain the plate 9 upon lip 8, but at the same time permit the rotation of the plate.

Rods 12 are threaded, or otherwise suitably secured, in plate 9, and carry a ring 13 at their upper extremities. Enlargements 14 are formed upon rods 12 to not only facilitate in screwing the rods into the support plate 9 but also provide shoulders which carry a ring 15. The coils of Figures 1–3 rest upon the ring.

As best shown in Figure 3, a fluid and air-tight chamber 16 is suitably secured to support plate 9 and contains the measuring liquid 17. The specific liquid may be of any satisfactory type, depending upon the specific operating conditions, but under most conditions mercury is the preferable liquid.

A pipe 18 extends from the top of chamber 16 and is bent down alongside the chamber and is supported from the underside of ring 15. As best shown in Figure 5, the free end is teed to provide two nipples 19 and 21 in which are located stopcocks 22 and 23.

Fitted into the base of chamber 16 is a tube 24 which extends to the upper surface of ring 15 and thence forms the helical tubing 25. The tubing 25 is wrapped about the rods 12 to form a helix, and each convolution rests upon the preceding one. It will therefore be noted that the inclination of the channel formed by the tubing is relatively slight.

While a more precise reading is obtained when the convolutions are in contact, under some circumstances it may be desirable to space the several convolutions, in the manner disclosed in the diagrammatic showing of Figure 5. In such case, it is necessary to offer support to each convolution. This may be accomplished by filling the space between the convolutions with a suitable filler, such as plaster of Paris, or again suitable supports may be formed upon the rods such as grooves in the rods, or brackets mounted on the rods.

It should be pointed out that the interior bore of the tubing should be sufficiently small so that the upper surface of the liquid therein is in the form of a meniscus. However, aside from this limitation, the size of the interior bore or the outside dimension of the coil, the diameter and length of the helix, and other constructional features such as the composition of the tubing, may be varied within relatively wide limits. It will be appreciated of course that if the position of the meniscus within the tubing is to be visually and directly observed, it will be necessary to form the tubing of transparent, or at least translucent, material.

The upper end of the tube 25 extends into an overflow well 26 of conventional construction, where any of the fluid which is forced beyond the top of tube 25 may be trapped. A pipe 27 extends upwardly from the overflow well, and thence downwardly, and at its bottom is teed to form nipples 28 and 29 provided with stopcocks 31 and 32, respectively. Tubing may be fitted over the several nipples 19, 21, 28 and 29 whereby pressure may be applied to the surface of the liquid in chamber 16 or to the top of the liquid column in coil 25. And also the pressure to be measured, when super-atmospheric, may be applied to the surface of the liquid in chamber 16, or, when sub-atmospheric, it may be introduced to the top of the coil 25 through nipple 28. It might be pointed out that the various nipples should be threaded when dealing with higher pressures.

As indicated above, it is essential that the channel of tubing 25 be disposed at a predetermined angle to the vertical, and this is best effected by arranging the tubing at a given angle to ring 15 which is preferably horizontal and secured in parallel position with respect to support ring 7. Consequently, maintenance of support ring 7 in a horizontal plane will insure that the fluid channel will be disposed at the proper angle to the vertical.

Therefore, for the purpose of determining the planular position of support ring 7, level indicators 33 and 34 are provided. These may be of any desired construction, and are depicted in the drawings as of the liquid bubble type. It will be noted that the two level indicators are disposed at right angles to each other, and therefore will indicate any departure of the ring 7 from the horizontal about any axis.

As heretofore indicated, if either of the indicators shows that the ring is out of the horizontal plane, it may be brought back by adjustment of the proper nut 4. It should be pointed out that an instrument of the type here under consideration is for the accurate measurement of forces within very narrow limits, which, particularly in view of the angle at which the channel is disposed to the vertical, makes it essential that the channel be closely maintained at the predetermined position.

Another critical factor arising from the angular disposition of the fluid channel is a marked tendency for the fluid to lag behind variations in the force being measured. This is particularly true where a variation in the force is recorded by the fluid receding from the channel. Such a recession, of course, is largely due to the pull of gravity, and in view of the relatively slight inclination of the channel, the resultant force of gravity tending to cause the fluid to recede is relatively slight. We have therefore found that it is necessary to take steps to insure a prompt reaction of the fluid to variations in pressure, and to this end we have provided means for vibrating the device.

Specifically, we have shown in Figures 2 and 3 a vibrating device 35 which may be of any conventional type, but which is preferably a high-frequency vibrator. This device is mounted upon a spindle 36 at one end and a spindle 37 at the opposite end. An extension 38 is provided for the spindle 37 and a knurled knob 39 which may be grasped to rotate the vibrator 35, as will be described hereafter.

The spindles 36 and 37 are journalled in depending brackets 41 and 42 to permit such rotation. Bracket 42 is provided with a channel which houses a spring 43 and a ball 44. Journal 37 is pitted to form seats 45 which are spaced ninety degrees apart, and in which the ball 44 is adapted to rest. It will be appreciated that such arrangement serves to fix the vibrator 35 in the desired position.

The impulses of vibrator 35 are imparted radially of the axis of the spindles and vibrator. Consequently when the ball 44 is in one of the seats 45, the vibrator will effect a vertical vibration, and when it is in the other seat 45 the vibrator will effect a horizontal vibration. We have found that both vertical and horizontal vibration is highly desirable to secure optimum accuracy in the instrument.

Figure 9:
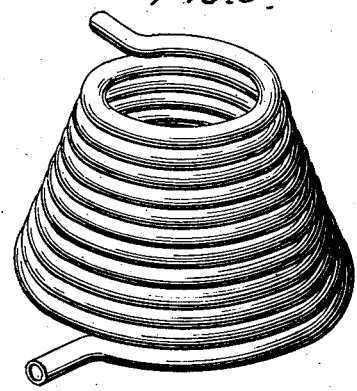
Figure 9 is a view depicting a modified shape for the channel.
Figure 10:
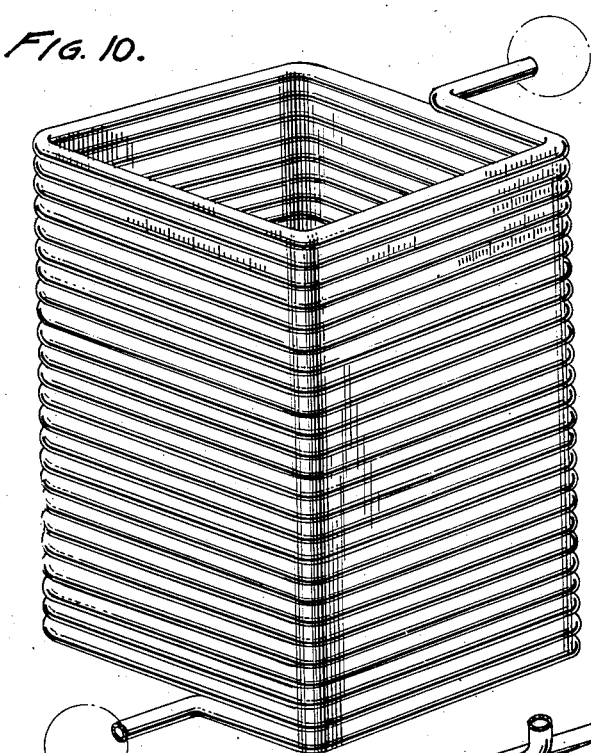
Figures 10 through 13 are diagrammatic showings of still further modified shapes for the channel.

While the coil of Figures 1-5 is in the form of a true cylindrical helix, and while such a form is preferable for most purposes, in some situations it may be desirable to wind the coil in the form of a cone or frusto cone as shown in Figure 9. It will be noted that with such a form of device, there will be no fixed definite ratio between linear movement of the meniscus and variations in the measured pressure, but rather there will be a decrease in the linear displacement as the liquid rises within the channel.

Figure 13:
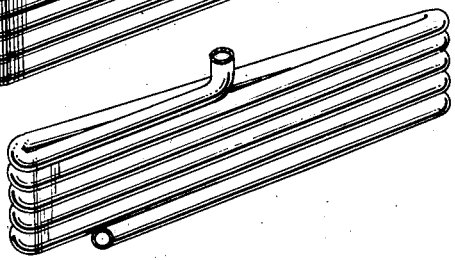
Figure 11:
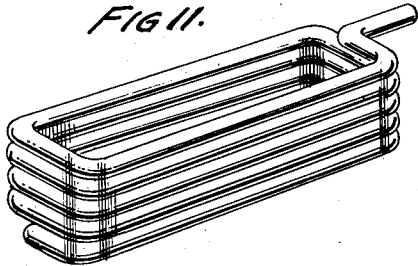
Figure 12:
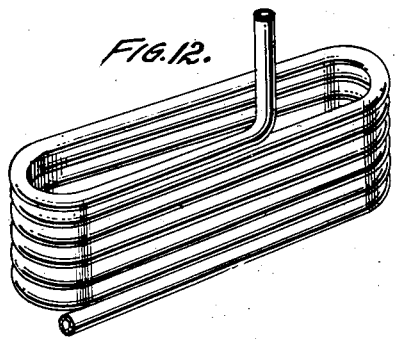

Under rather rare circumstances the tubing may be shaped as in Figures 10-13, although ordinarily, it should be noted, relatively sharp curves or angles in the tubing should be avoided. In these figures it will be noted that the coil is shaped to form a square in Figure 10, an oblong in Figure 11, an elliptical-like shape in Figure 12, and a relatively planular arrangement is depicted in Figure 13.

Figure 8:
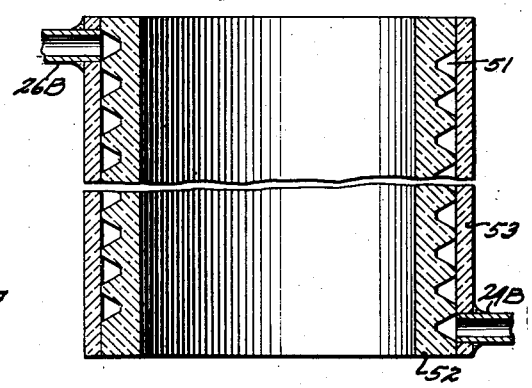
Figure 8 is a view of a further modified form of channel.
Figure 7:
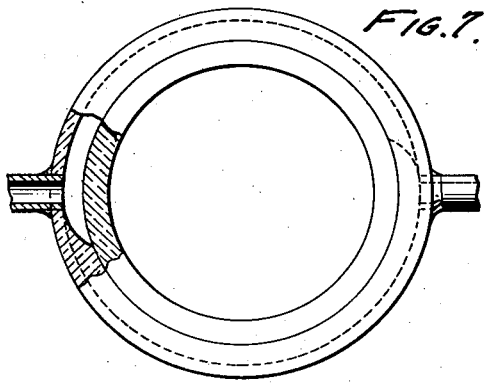
Figure 7 is a view partly in section and partly in plan taken along the line 7—7 of Figure 6.

For many uses, particularly where a high degree of accuracy is desired, it may be preferable to form the channel for the fluid as shown in Figures 6 or 8, or possibly a combination of the devices shown in Figures 6 and 8. With a tube it is difficult to insure that the channel therein is of uniform diameter throughout, and for highly accurate work even slight variations may impair the accuracy. Consequently this invention includes the concept of cutting a spiral groove in a cylinder and the use of a tightly fitting cylinder in association therewith to seal each convolution from the adjacent ones.

For instance in Figure 6 we have disclosed a cylinder 47, upon the interior of which a spiral groove 48 is cut. There is then inserted within the cylinder 47 another cylinder 49 having an outside diameter closely approximating the inside diameter of cylinder 47 and which fits within cylinder 47 sufficiently close to separate the several helices of channel 48. Obviously the channel 48 may be machined smoothly to insure a uniform size through its length. The close fit between the cylinders 47 and 49 may alone suffice to effect the seal for the channel, but if desired a cementitious material or fluid-repellent paste or paint may be applied to seal the channel and hold the cylinders in assembled position. In employing the device of Figure 6, a pipe 24A is connected to the chamber 16 and a pipe 26A extends from the upper part of the channel to the overflow well.

In Figure 8, it will be noted that the channel 51 is cut upon the exterior face of a cylinder 52 and a second cylinder 53 is fitted over the cylinder 52. These two cylinders may be assembled, and the channel sealed, in the same way as described above in connection with Figure 6. Likewise a pipe 24B connects the channel with chamber 16 and a pipe 26B leads to the overflow well.

It will be appreciated that the channel may also be formed by cutting spiraled grooves both upon the exterior of the inner cylinder and also upon the interior of the outer cylinder, and then assembling the two cylinders so that such opposing grooves will register with one another.

While Figures 6 and 8 show the use of two cylinders, to form a helical channel, it should be pointed out that under suitable conditions a channel may be formed in two matched members in the shape of the channels shown in Figures 9 or 11-14 by the use of appropriately shaped inner and outer members. For instance, two frusto-conical cylinders may be employed to provide a channel of the shape of that shown in Figure 9, and the grooves cut upon one or the other of said frusto-conical cylinders, or both, as described in connection with Figures 6 and 8. This type of device may be especially desirable inasmuch as a tighter fit and greater ease in assembling would result.

The cylinders of Figures 6 and 8 may be formed of various materials, but we would prefer one of the synthetic resins or plastics. The precise material employed will depend upon various factors, the principal one of which will be the specific fluid employed. Obviously the plastic should be resistant to the fluid, and also should have a low frictional coefficient therewith.

As indicated above, the position of the meniscus within the channel may be visually observed by the operator, and for this purpose suitable calibrations 54, such as shown in Figure 4, may be etched or otherwise placed upon the tubing 25 or upon the exterior cylinder of Figures 6 and 8. The exact calibrations may be worked out for each instrument, and, especially in the case of an instrument having a closed end, the increment of the calibrations may have to be varied in a predetermined way along the length of the channel.

In Figures 14-16 there is shown a means of indirectly indicating, by electricity, the position of the meniscus within the channel. These figures disclose the electrical measuring device applied to a tube type of apparatus, generally similar to that shown in Figures 1-5, but it will be appreciated that it may as readily be used in connection with devices such as Figure 6 or 8.

As best shown in Figure 14, an electrode 55 extends into the bottom of tank 16, passing through the tank in a fluid tight fit. To this electrode a suitable conductor 56 is attached.

Extending throughout the length of tube 25, and part of the way down through section 24, is a wire 57. The wire 57 is mounted upon suitable spaced supports, not shown, in order to maintain the wire in the desired position within the tube. In the device shown in Figure 14, an overflow well is not disclosed, and the wire 57 is carried down through section 27C and thence out through the bottom of that section through a fluid tight fit to a terminal 58. The wire 57 need not necessarily extend to the base of section 27C, and particularly, if an overflow well is used, it may pass out of the system at the overflow well. A suitable connector 59 is secured in terminal 58. The vibrator of Figures 2 and 3 is also in the form of the device of Figure 14.

Figure 16 sets forth one form of circuit that may be employed. In this circuit the wire 57 constitutes a resistance in one leg of a simple Wheatstone bridge designated generally 61. In the leg parallel to 57 are a plurality of resistance elements designated generally 62, which are connected in series and tapped off to a switch arm 63. The opposite legs of the bridge circuit include balancing resistors 64 that are connected to a common lead 65 leading to one pole of a battery 66.

Switch arm 63 is connected to one end of a potentiometer 67, the opposite end of which is connected by the conductor 56 to the electrode 55. The contact arm 68 of the potentiometer 67 is connected to the opposite pole of the battery 66.

A suitable indicating instrument such as a milli-voltmeter 69 is shunted across the bridge in a conventional manner. The dial of this instrument may be graduated in fractions of millimeters of mercury or any suitable indicia depending on the use to which the instrument is to be put. This scale may run from zero to any convenient number. In use, this recording on the scale is applied to that section of the channel in which the meniscus is located by regulating the variable resistance 62. In other words, the resistance of any section of the helix may be roughly balanced by the variable resistance 62, and then the potential difference noted upon the voltmeter 69. Thus the entire scale of the meter may be utilized to cover a relatively small section of the helix, thereby increasing the accuracy of reading for a scale of any given length.

It will be appreciated of course that by electrically registering the position of the meniscus, a device of conventional construction may be used to permanently record the position upon graphs.

The operation of our device is believed to be apparent from the foregoing. Briefly, it is merely a question of subjecting a body of liquid in the chamber 16 and coil 25 to the force or pressure which it is desired to measure. As stated, the specific liquid that is employed will depend largely upon the factors present in any particular situation, but generally we have found mercury to be the preferable liquid.

Either the surface of the liquid in chamber 16 may be subjected to the pressure to be measured, in which case a predetermined and fixed pressure is maintained upon the meniscus and throughout the portion of the coil 25 above the meniscus; or the pressure to be measured may act upon the meniscus and a predetermined pressure maintained upon the top of the liquid within chamber 16. In the former case a tube or pipe is fixed upon nipple 19, and another tube or pipe is fixed upon nipple 28, the former in communication with the gas whose pressure is to be measured, and the latter being placed in communication with a device to establish a given pressure.

In actual practice the nipple 28 is usually connected to a vacuum pump to exhaust that portion of the coil above the mercury column to a predetermined degree. In such exhausting step, the stopcocks 22, 23 and 32 should be closed while stopcock 31 is open. When the tubing 25 has been thus exhausted to the desired degree, stopcock 31 may be closed, and stopcock 22 then opened to thereby subject the top of the liquid in chamber 16 to the pressure to be measured. This pressure, usually super-atmospheric, will then force the mercury column upwardly through the coil 25 to a point of equilibrium. Knowing the pressure that was initially present in the upper part of the coil, the position at which the meniscus comes to rest will thereby determine the pressure which is being measured.

While the process just described could be used to measure sub-atmospheric pressures, especially if a sufficient vacuum were drawn through nipple 28, in actual practice sub-atmospheric pressures are best measured by reversing the above process. For instance, to measure sub-atmospheric pressure it is preferable to connect nipple 21 to a pressure pump and to connect nipple 29 to the instrument to be tested. A predetermined pressure is then established in chamber 16 above the liquid level by means of a pressure pump, and then the stopcock 32 is opened, and the displacement of the meniscus noted. In both types of operation, it will be appreciated that it is desirable to have the meniscus located a sufficient distance above the base of coil 25 to prevent any change in pressure causing the meniscus to drop down into coupling section 24.

It will be understood that prior to operating the device, supporting ring 7 and support plate 9 or the supporting ring 7a are brought to the true horizontal as indicated by the levels 33 and 34, by means of adjustments made on nuts 4. Likewise during the measuring step, vibrator 35 is operated, and, from time to time, is rotated through ninety degrees to impart both vertical and horizontal vibration to the instrument.

As mentioned, the position of the meniscus within col 25, or within the channels shown in Figures 6 through 13, may be visually and directly observed and noted upon the calibrations 54.

However, if it is desired to use a device which electrically indicates the position of the meniscus, then such positon may be determined by reading the meter 69. As heretofore indicated, the arm 63 of the rheostat or variable resistor 62 will have to be manipulated so that the resistance therein is substantially equal to the resistance of the wire 57 beyond the mercury column, and then the potential difference noted upon the meter 69. For instance if the meniscus is in substantially the mid height of the coil 25, then in a resistor such as shown in Figure 17 the arm 63 would tap the middle resistance element, and the meter 69 would register the difference in potential between the wire 57 above the meniscus and the resistors 62 in the circuit. Departure of the meniscus from that section of the coil 25 corresponding to the middle resistance element would necessitate an adjustment of arm 3 to the resistance element which covers such new section of the coil.

While the inventive concept here disclosed may find physical embodiment in various types of instruments, and it is to be understood that our invention is to be given a scope of such breadth except as otherwise specifically claimed, there has been specifically disclosed herein a manometer because it is in this type of instrument that the invention finds probably its broadest application. The uses of such a manometer are manifold and a recitation of such uses will not be included herein. Suffice it to say, that where a high accuracy reading of a pressure is desired, a manometer constructed along the lines here disclosed has been found to be highly efficacious.

While we have shown and described the preferred embodiment of our invention, we wish it to be understood that we do not confine ourselves to the precise details of construction herein set forth by way of illustration, as it is apparent that many changes and variations may be made therein, by those skilled in the art, without departing from the spirit of the invention, or exceeding the scope of the appended claims.

We claim:

1. A device for measuring a pressure comprising a support plate, a ring within which the support plate may be rotated, support members for the ring, means to adjust said ring to assume the true horizontal, a chamber carried by the support plate, a channel member supported by said support plate and in communication with the chamber and extending around the chamber for a portion of its length, said channel being inclined at a relatively low angle to the support plate, a liquid within the chamber and communicating channel, a conduit in communication with the upper portion of the chamber and above the normal liquid level therein whereby the liquid may be subjected to the pressure being measured, vibrating means adjustably supported by said ring, and means operatively connected with said vibrating means to selectively position the same whereby vertical or horizontal vibrations may be imparted to the ring, support plate, chamber, and channel member.

2. A device for measuring a pressure comprising a support plate, a ring within which the support plate may be rotated, screw members adapted to support the ring and which may be rotated to maintain the ring and support plate in the true horizontal, a chamber carried by the support plate, a translucent tube supported by said plate and in communication with the chamber and arranged in the form of a low pitched helix, the lower end of said helix surrounding the chamber, a liquid within the chamber and helix, a conduit in communication with the upper portion of the chamber and above the normal liquid level therein, whereby the liquid may be subjected to the pressure being measured, valve means for controlling communication with the helix above the liquid level therein, a level indicator mounted on the ring, an adjustable vibrating device suspended from the ring, and means operatively connected to the vibrating device to selectively position the same for imparting vertical or horizontal vibrations to the ring, support plate, chamber and translucent tube.

3. A device for measuring a pressure comprising a support plate, a ring within which the support plate may be rotated, screw members adapted to support the ring and which may be rotated to vary the plane of the ring, a chamber carried by the support plate, a cylinder surrounding the chamber, a second cylinder closely fitting within the first cylinder in a fluid tight fit, one of said cylinders being provided with a helical groove adjacent the other cylinder to form a helical channel, the lower end of said channel being in communication with the chamber, a liquid within the chamber and channel, a conduit in communication with the upper portion of the chamber and above the normal liquid level therein, whereby a liquid may be subjected to the pressure being measured, a level indicator mounted on the above mentioned ring, and a vibrating device suspended from the ring and adapted to be rotated to impart vibrations in either substantially vertical or perpendicular planes.

4. A device for measuring a pressure comprising a support plate, screw members adapted to support the plate and which may be rotated to maintain the plate in true horizontal, a chamber carried by the support plate, a translucent tube supported by said plate and in communication with the chamber and arranged in the form of a low pitched helix, the lower end of said helix surrounding the chamber, a liquid within the chamber and helix, a conduit in communication with the upper portion of the chamber and above the normal liquid level therein, whereby the liquid may be subjected to the pressure being measured, means for controlling communication with the helix above the liquid level therein, a wire extending through the tube and into the body of liquid therein, an electrode in the base of the chamber, said wire and electrode forming part of a circuit which includes a Wheatstone bridge, a variable resistance within one leg of the Wheatstone bridge, the body of liquid being located within the opposite leg, and a meter indicating the difference of potential between the two legs of the bridge.

5. In an apparatus for measuring a force, a support member, means to maintain said support member in the true horizontal, a container on said support member a body of liquid in said container and subject to the force, an elongated channel inclined at an angle to the vertical supported by said support member, a connection between the container and channel whereby the liquid will move in the channel upon variations in force, adjustable vibrating means suspended from said support member, and means operatively connected to said vibrating means to selectively position the same to impart vertical or horizontal vibrations to the support member, body of liquid, and elongated channel.

6. In an apparatus for measuring a force, a support, means to maintain said support in the true horizontal, a container on said support, a body of liquid in said container and subject to the force, an elongated helical channel supported by said support and in communication with said container for the body of liquid whereby the liquid will move in the channel upon variations in force, an adjustable vibrating device suspended from the support, and manually operated means operatively connected to said vibrating device to selectively position the same for imparting horizontal or vertical vibrations to said support, body of liquid, and helical channel.

7. In an apparatus for measuring a force, a support, an elongated channel inclined at an angle to the vertical mounted on the support, a fluid in the channel subject to the force and movable in the channel upon variations in the force, an adjustable vibrating device suspended from said support, and manually operated means operatively connected to said vibrating device to selectively position the same to impart horizontal or vertical vibrations to the support and elongated channel.

8. In an apparatus for measuring a force, a support, an elongated helical channel fixedly carried by said support, a fluid in the channel subject to the force and movable in the channel upon variations in the force, an adjustable vibrating device suspended from the support, and means operatively connected to said vibrating device to selectively position the same to impart vertical or horizontal vibrations to the support and elongated helical channel.

9. In a device for measuring a force, a support, an elongated helical channel mounted on said support, a fluid in the channel subject to the force and movable in the channel upon variations in the force, an adjustable vibrating device suspended from the support, manually operated means operatively connected with said vibrating device to selectively position the same to impart vertical or horizontal vibrations to the support and helical channel, and means whereby the support and channel may be rotated.

ROBERT H. CUYLER.
RICHARD L. GOETH.